(12) United States Patent
Hu

(10) Patent No.: US 11,573,754 B1
(45) Date of Patent: Feb. 7, 2023

(54) INFORMATION PROCESSING APPARATUS, IMAGE FORMATION SYSTEM, AND JOB PROCESSING METHOD THAT AUTOMATICALLY CONTROLS EXECUTION ORDER OF PRINT JOBS

(71) Applicant: KYOCERA Document Solutions Inc., Osaka (JP)

(72) Inventor: Jiangang Hu, Martinez, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/524,706

(22) Filed: Nov. 11, 2021

(51) Int. Cl.
  *G06F 3/12* (2006.01)
(52) U.S. Cl.
  CPC .......... *G06F 3/1263* (2013.01); *G06F 3/1207* (2013.01)
(58) Field of Classification Search
  CPC ............................ G06F 3/1263; G06F 3/1207
  See application file for complete search history.

(56) References Cited

U.S. PATENT DOCUMENTS

| | | | |
|---|---|---|---|
| 2015/0180737 A1* | 6/2015 | Vijayarangan | H04L 41/5054 709/226 |
| 2016/0210087 A1* | 7/2016 | Amir | G06F 3/126 |
| 2016/0292664 A1* | 10/2016 | Gilfoyle | G06Q 10/08 |

FOREIGN PATENT DOCUMENTS

JP          2003-316546 A          11/2003

* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is an information processing apparatus that automatically controls the execution order of print jobs. For example, the image forming apparatus is an information processing apparatus for processing the print jobs. A time deviation calculation unit sets a window of a specific length in the print queue in which the print jobs are stored. A time deviation calculation unit calculates total print time and deviation of the print time of the print jobs in the window. The print control unit controls the execution order of the print jobs in the window based on the total print time and the deviation calculated by the time deviation calculation unit. The output unit outputs the print jobs in the execution order controlled by the print control unit.

12 Claims, 8 Drawing Sheets

INFORMATION PROCESSING APPARATUS, IMAGE FORMATION SYSTEM, AND JOB PROCESSING METHOD THAT AUTOMATICALLY CONTROLS EXECUTION ORDER OF PRINT JOBS

BACKGROUND

The present disclosure particularly relates to an information processing apparatus for processing a print job, an image forming system, and a job processing method.

Typically, there has been an image forming apparatus such as a multifunctional peripheral (MFP) capable of printing a document or an image. In the image forming apparatus, jobs which are data for a plurality of outputs are stored in a queue in the order of acquisition from other terminal(s) and output in the order of acquisition. However, in particular, when there is a print job with a long print time in the queue and then a print job with a short print time, the output is delayed. This keeps a user who expects outputting to be completed soon.

Here, in a typical image forming apparatus, a print server apparatus that performs processing when output processing of each print job is requested by a plurality of users is disclosed. This apparatus notifies other users of the requested change content when requested to change the output information and output order of the print job or to stop the output processing acquired from another computer. In addition, this apparatus acquires a notification from each user as to whether or not to permit the change processing based on the notified change content. As a result, when the changing, or the like, in the output order of each print job is requested, the other users can confirm the change content and perform other works, appropriately. Therefore, work efficiency can be improved.

SUMMARY

An information processing apparatus according to the present disclosure is an information processing apparatus for processing print jobs, including: a time deviation calculation unit configured to set a window of a specific length in a print queue in which the print jobs are stored and calculate total print time and deviation of the print time of the print jobs in the window; a print control unit configured to control execution order of the print jobs in the window based on the total print time and the deviation calculated by the time deviation calculation unit; an output unit configured to output the print jobs in the execution order controlled by the print control unit.

An image forming system according to the present disclosure is an image forming system having an image forming apparatus and an information processing apparatus for processing print jobs of the image forming apparatus, the information processing apparatus including: a job acquisition unit configured to acquire the print job and stores it in print queue, a time deviation calculation unit configured to set a window of a specific length in a print queue in which the print jobs acquired by the job acquisition unit are stored and calculate total print time and deviation of the print time of the print jobs in the window, a print control unit configured to control execution order of the print jobs in the window based on the total print time and the deviation calculated by the time deviation calculation unit, and a job transmitting unit configured to transmit the print jobs to the image forming apparatus in the execution order controlled by the print control unit; and the image forming apparatus including: a job receiving unit configured to receive the print jobs from the information processing apparatus, and an image forming unit that forms an image of each of the print jobs.

An job processing method according to the present disclosure is a job processing method executed by an information processing apparatus for processing print jobs of an image forming apparatus, including the steps of: setting a window of a specific length is set in a print queue in which the print job is stored; calculating total print time and deviation of the print time of the print jobs in the window; controlling execution order of the print job in the window based on calculated total print time and deviation; and outputting the print jobs in controlled execution order.

DETAILED DESCRIPTION

Embodiment

[System Configuration of Image Forming System X]

Figure 1:
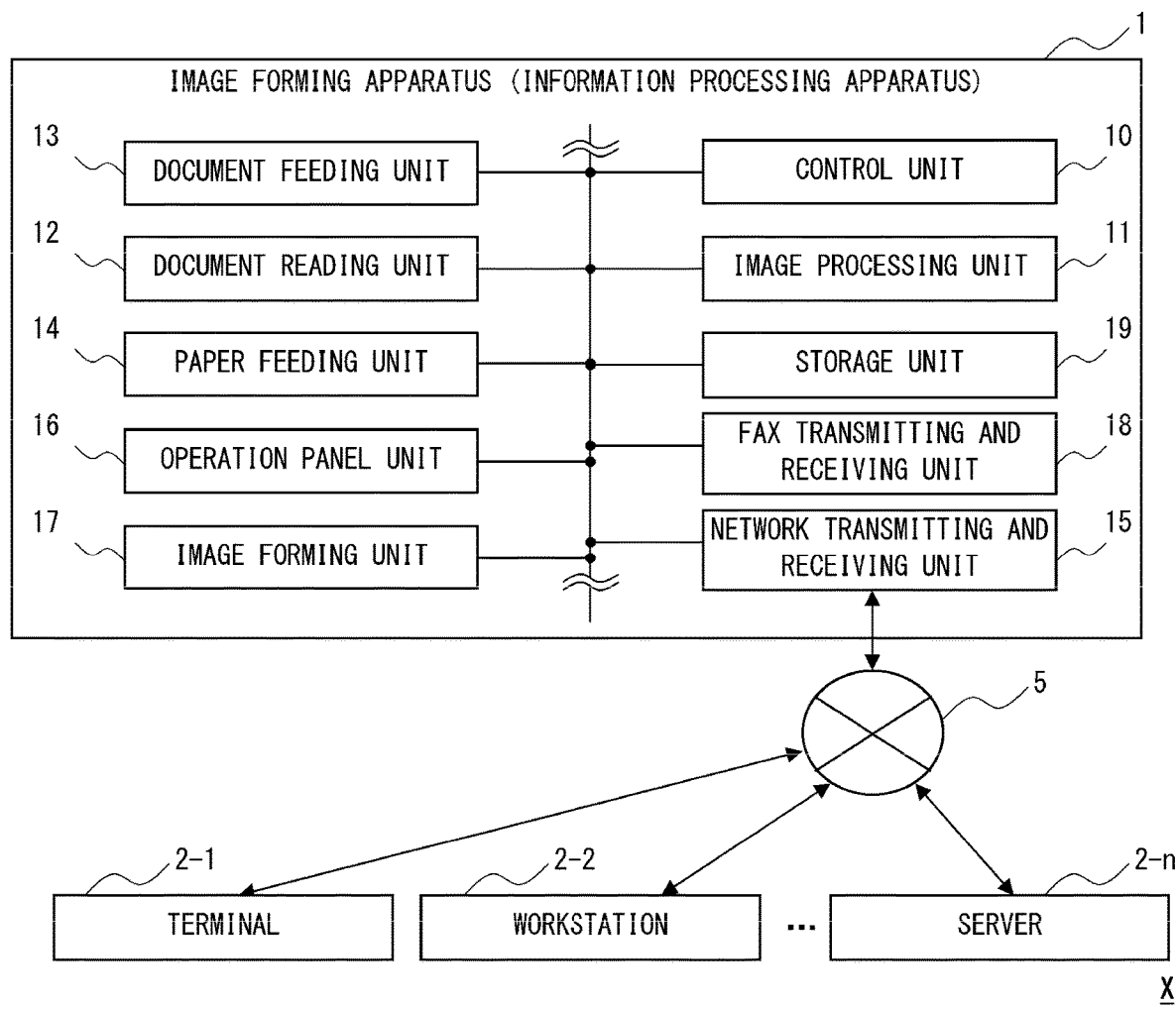
FIG. 1 is a system configuration diagram of an image forming system according to an embodiment of the present disclosure.

Firstly, with reference to FIG. 1, a system configuration of the image forming system X according to the embodiment of the present disclosure is described.

Figure 2:
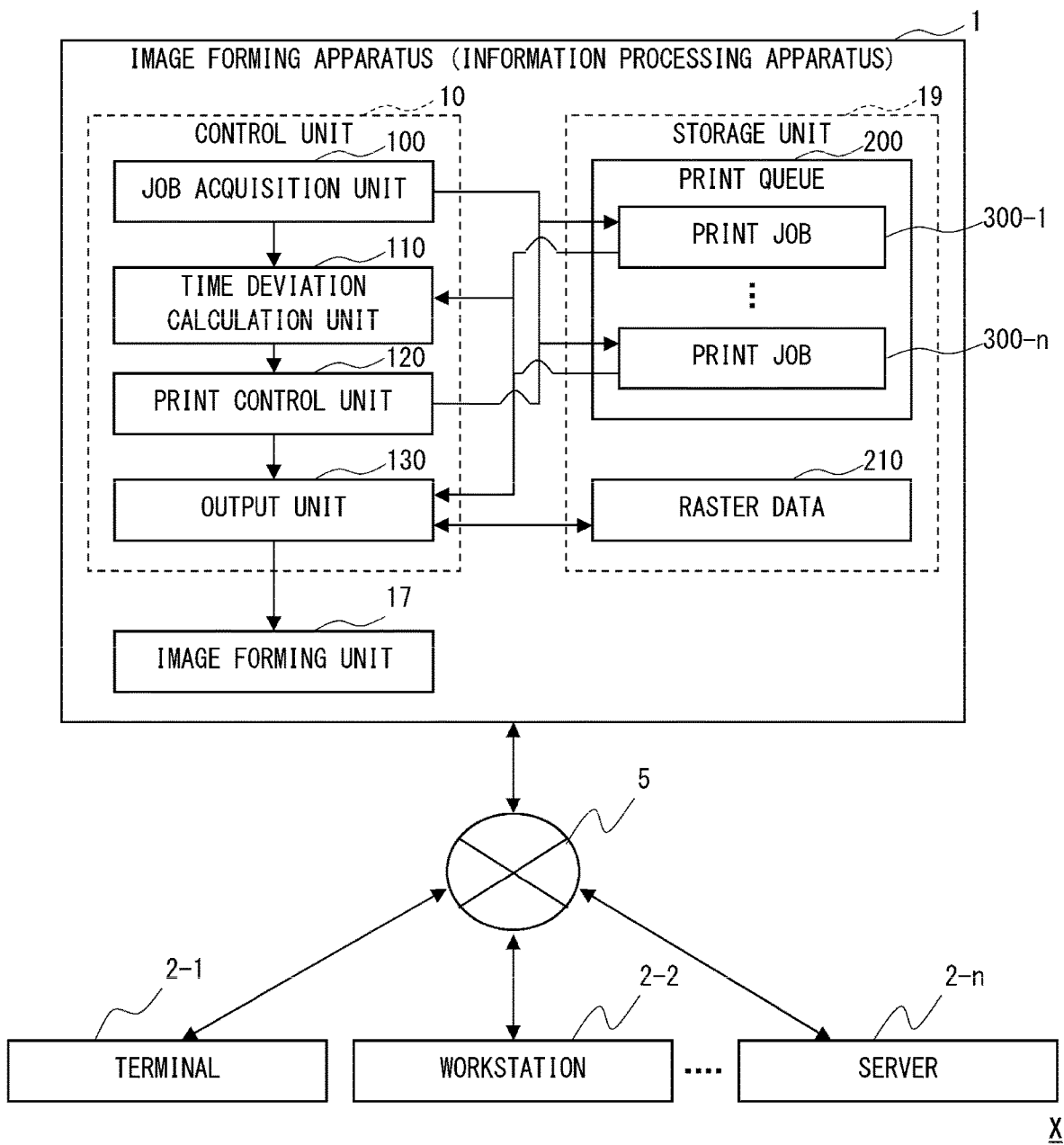
FIG. 2 is a block diagram showing a functional configuration of the image forming system according to the embodiment of the present disclosure.

The image forming system X is a system that is connected to the network 5 and can print out the print job 300 (FIG. 2). In the present embodiment, the image forming system X functions as a print job control system capable of controlling the output (execution) order of the print job 300.

Specifically, in the image forming system X, the image forming apparatus 1 and a plurality of apparatuses are connected to the network 5. The plurality of apparatuses includes apparatuses capable of transmitting the print job 300 to the image forming apparatus 1, such as a terminal 2-1 and a workstation 2-2, a server 2-n, and the like. Further, hereinafter, each apparatus such as the terminal 2-1 to the server 2-n is simply referred to as a "terminal, or the like." In addition, the terminal, or the like, may include the other apparatus capable of outputting the print job 300.

Then, the control configuration of the image forming apparatus 1 is described.

The image forming apparatus 1 according to the present embodiment is an example of an information processing apparatus for processing the print job 300 (FIG. 2).

The image forming apparatus 1 includes an image processing unit 11, a document reading unit 12, a document feeding unit 13, a paper feeding unit 14, a network transmitting and receiving unit 15, an operation panel unit 16, an image forming unit 17, a fax transmitting and receiving unit 18, a storage unit 19, and the like. Each unit is connected to the control unit 10, and the operation is controlled by the control unit 10.

The control unit 10 is an information processing unit including a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for a specific application), or the like.

The control unit 10 reads out the control program stored in the ROM or HDD of the storage unit 19, expands the control program in the RAM, and executes it, so that the control unit 10 can be operated as each unit of the functional block as described later. In the present embodiment, the control unit 10 executes the print job 300 (FIG. 2) and controls the execution order of the print job 300.

Further, the control unit 10 controls the entire apparatus according to instruction information inputted from the terminal, or the like, or the operation panel unit 16.

The image processing unit 11 is a control calculation unit such as a DSP (Digital Signal Processor), a GPU (Graphics Processing Unit), or the like. The image processing unit 11 performs image processing on the image data. The image processing may be, for example, processing such as enlargement and reduction, density adjustment, gradation adjustment, image improvement, and the like.

Further, the image processing unit 11 stores the image read by the document reading unit 12 in the storage unit 19 as print data. The print data may also be treated as the print job 300 (FIG. 2) as described later. Further, the image processing unit 11 can also convert the print data into an electronic document such as PDF, or the like, and an image data file such as TIFF, or the like.

The document reading unit 12 reads the set document. Further, the document reading unit 12 is arranged above the main body of the image forming apparatus 1.

The document reading unit 12 includes a scanner, platen glass, and a document reading slit. When reading a document placed on the platen glass, the document reading unit 12 moves the scanner to a position facing the platen glass and scans the document placed on the platen glass to acquire image data. The acquired image data may be image-processed by the image processing unit 11 as described above.

Further, when reading the document supplied from the document feeding unit 13, the document reading unit 12 moves the scanner to a position facing the document reading slit. Then, the document reading unit 12 reads the document through the document reading slit in synchronization with the document transport operation by the document feeding unit 13 to acquire image data. The acquired image data may be image-processed by the image processing unit 11 as described above.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit to the document reading unit 12 one by one by the document transport mechanism.

The paper feeding unit 14 feeds the recording paper one by one toward the image forming unit 17. The paper feeding unit 14 is provided in the main body unit.

The network transmitting and receiving unit 15 is a network connection unit including a LAN board, a wireless transmitter and receiver, and the like, for connecting to the network 5. The network 5 of the present embodiment is, for example, a LAN, a wireless LAN, a WAN, a mobile phone network, a voice telephone network, or the like.

The network transmitting and receiving unit 15 transmits and receives data on a data communication line, and it transmits and receives a voice signal on a voice telephone line.

In the present embodiment, the network transmitting and receiving unit 15 receives the print job 300 (FIG. 2) from the terminal, or the like, and stores it in the storage unit 19.

The operation panel unit 16 includes an input unit such as a button or a touch panel, or the like, and a display unit such as an LCD (Liquid Crystal Display), an organic EL (Electro Luminescence) display, or the like. Further, the operation panel unit 16 is arranged on the front side of the image forming apparatus 1.

The input unit of the operation panel unit 16 includes a numeric keypad, a start button, a cancel button, an operation mode switching button, a button for instructing job execution, and the like. In the present embodiment, the operation mode includes modes such as copying, fax transmission, scanner, network scanner, or the like. The type of job may be the print job 300 (FIG. 2), a send job, a save job, a record job, and the like. The input unit of the operation panel unit 16 acquires instructions for each job of the image forming apparatus 1 by a user such as an administrator or an operator for the image forming system X.

At this time, as is described later, the print job 300 may be automatically rearranged in the execution order. Further, changing the execution order of each job according to the instruction of the administrator or the user from the operation panel unit 16 can be performed.

Also, the information of each user can be inputted or changed according to the instruction of the administrator or the user acquired from the operation panel unit 16.

The image forming unit 17 forms an image on the recording paper from the data stored in the storage unit 19, read by the document reading unit 12, or acquired from the terminal, or the like, according to the output instruction of the administrator or the user.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

The FAX transmitting and receiving unit 18 transmits and receives a facsimile. The FAX transmitting and receiving unit 18 can receive facsimile from another FAX apparatus via a voice line and store the received data as the print job 300 (FIG. 2) in the storage unit 19. The print job 300 according to the received data can also be image-formed by the image forming unit 17.

Further, the FAX transmitting and receiving unit 18 can convert the document data read by the document reading unit 12 and the network FAX data transmitted from the external terminal into image data, and it can facsimile-transmit the image data to another FAX apparatus by the voice line as the transmission job.

The storage unit 19 is a non-transitory recording medium such as a semiconductor memory such as a ROM (Read Only Memory) and a RAM (Random Access Memory), an HDD (Hard Disk Drive), or the like.

A control program for controlling the operation of the image forming apparatus 1 is stored in the ROM or HDD of the storage unit 19. Further, the storage unit 19 also includes each job, a temporary area for outputting the job, and the like.

Also, the storage unit 19 also stores the user's account settings. Further, the storage unit 19 may include an area of a storage folder for each user.

In addition, in the image forming apparatus 1, the control unit 10 and the image processing unit 11 may be integrally-formed such as a CPU having a built-in GPU, a chip-on-module package, an SOC (System On a Chip), or the like.

Further, the control unit 10 and the image processing unit 11 may have a built-in RAM, ROM, flash memory, or the like.

[Functional Configuration of Image Forming Apparatus 1]

Here, with reference to FIG. 2, a functional configuration of the image forming apparatus 1 is described.

The control unit 10 of the image forming apparatus 1 includes a job acquisition unit 100, a time deviation calculation unit 110, a print control unit 120, and an output unit 130.

The storage unit 19 stores a print queue 200 and a raster data 210.

The job acquisition unit 100 acquires the print jobs 300 from the terminal, or the like, makes each of them identifiable, and stores them in the print queue 200 of the storage unit 19 in the order of FIFO (First In, First Out).

The time deviation calculation unit 110 sets a window W having a specific length in the print queue 200 in which the print job 300 is stored. For example, the specific length may be a length (number) of several to several tens of the printing jobs 300. Further, the specific length of the window W can be set by the administrator, the user, or the like, of the image forming system X in consideration of the printing situation, and the like.

On this basis, the time deviation calculation unit 110 calculates the total print time and the deviation of the print time of the print job 300 in the window W.

The print control unit 120 controls the execution order of the print jobs 300 in the window of the print queue 200 based on the total print time and the deviation calculated by the time deviation calculation unit 110.

Specifically, the print control unit 120 controls the execution order of the print job 300 when the total print time is equal to or greater than the time threshold T0 and the deviation is equal to or greater than the deviation threshold σ0. The time threshold T0 is possible to be set by the administrator or the user according to the permissible range of the user, for example, several minutes to several tens of minutes. Similarly, the deviation threshold σ0 can be set by, for example, an administrator or a user. In an example as described later, the deviation threshold σ0 is a value obtained by dividing the time threshold T0 by three times of the specific length, and when it is more than 1.0, it is set to 1.0.

More specifically, in the present embodiment, for example, the print control unit 120 rearranges the print jobs 300 in the window in ascending order of print time as the control of the execution order of the print jobs 300.

On the other hand, when the total print time is less than the time threshold T0, the print control unit 120 may advance the window one by one in the print queue 200 without rearranging the execution order of the print jobs 300.

Further, when the deviation is less than the deviation threshold σ0, the print control unit 120 may advance the window by the next specific length in the print queue 200 without rearranging the execution order of the print job 300.

The output unit 130 outputs (executes) the print job 300 in the print queue 200 in the execution order controlled by the print control unit 120. In the present embodiment, the output unit 130 renders the print jobs 300 one by one in the sorted execution order (Raster-In Process, hereinafter referred to as "RIP") and generates raster data 210. On this basis, the output unit 130 causes the image forming unit 17 to form an image of the raster data 210 on the recording paper.

The print queue 200 is a queue in which print jobs 300-1 to print jobs 300-n for executing are stored. Hereinafter, when one of the print jobs 300-1 to the print job 300-n is shown, it is simply referred to as "the print job 300". Further, the print queue 200 may include a print time value calculated for each print job 300.

The print queue 200 may be a part of a queue in which jobs of types other than the print job 300 are stored.

The print job 300 includes, for example, a PDL (Page Description Language) file, a PS (Post Script) file, an electronic document file such as a PDF (Portable Document Format), an HTML (Hyper Text Markup Language), an XML (Extensible Markup Language), and a text file, a file of a various application software (hereinafter referred to as "application") such as a word processor, a spreadsheet, a presentation software, or the like, an e-mail, facsimile data, image data, and other file that can be output by printing. The print job 300 may include image data and other binary data.

The raster data 210 is, for example, raster image data that has been RIP-ed. The raster data 210 may be, for example, bitmap image data of RGB (Red, Green, Blue) color or CMYK (Cyan, Magenta, Yellow, and Key plate) color, band data obtained by dividing the bitmap image data, or the like.

Here, the control unit 10 of the image forming apparatus 1 functions as the job acquisition unit 100, the time deviation calculation unit 110, the print control unit 120, and the output unit 130 by executing a control program stored in the storage unit 19.

Further, each part of the image forming apparatus 1 described above becomes a hardware resource for executing the image forming method of the present disclosure.

In addition, a part or any combination of the above-mentioned functional configurations may be configured in terms of hardware or circuit by IC, a programmable logic, FPGA (Field-Programmable Gate Array), or the like.

[Print Control Process by Image Forming Apparatus 1]

Next, with reference to FIGS. 3 to 7, the print control process by the image forming apparatus 1 according to the embodiment of the present disclosure is described.

Figure 3:
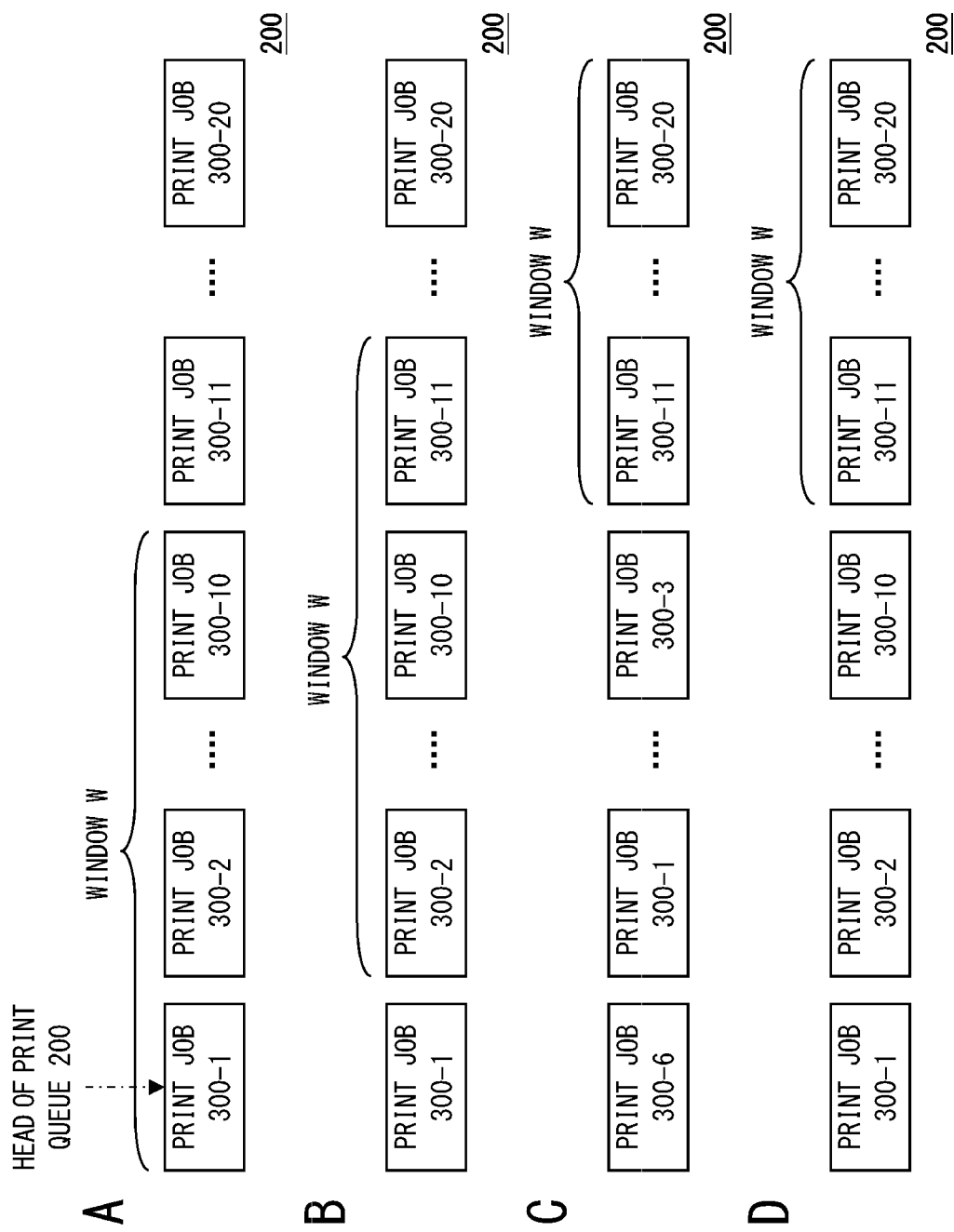
FIG. 3 is a conceptual diagram showing an outline of the print control process according to the embodiment of the present disclosure.

Firstly, with reference to FIG. 3, the outline of this process is described.

In the print control process according to the present embodiment, a print control process is performed in order to efficiently process the print job 300 generated from a plurality of terminals, or the like, connected to the network 5. In the print control process, the print jobs 300 in the print queue 200 are automatically rearranged in the window W based on various conditions.

Therefore, at first, in the print queue 200, by using the window W of the print job 300 having the specific length, whether or not output of all the print jobs 300 can be completed within the specific time threshold T0 is calculated.

In the element "A" of FIG. 3, total print time T is calculated with the first ten print jobs 300 in the print queue 200 as the window W.

At this time, if the total print time T is within the time threshold T0 and the output can be completed, the execution order does not need to be changed, so the rearrangement is not performed.

The element "B" of FIG. 3 shows an example in which the print job 300 is not rearranged, and the window W is slide-moved to next one in the print queue 200 in this way.

Here, in other cases, the deviation div of the print time of the print job 300 in the window W is calculated. If this deviation div is equal to or greater than the deviation threshold σ0, the execution order of the print job 300 is rearranged from the shortest to the longest print time (ascending order).

The element "C" in FIG. 3 shows an example of a state in which the print jobs 300 in the window W are rearranged and then moved forward by the next specific length in the print queue 200. Here, the print jobs 300-1 to the print jobs 300-11 are rearranged such as the print job 300-6, the print job 300-1, . . . the print job 300-3. As a result, it is possible to prevent the print job 300 having a long print time from being present in the window W and causing a bottleneck in which the print job 300 is waited until another print job 300 is output. On top of this, even for the print job 300 having a long print time, by using the window W, an unlimited delay with reference to the time threshold T0 can be prevented.

On the other hand, if the deviation div is less than the deviation threshold σ0, the print control unit 120 moves the window W.

The element "D" in FIG. 3 shows an example of a condition in which the print jobs 300 in the window W are moved without being rearranged when the deviation div is less than the deviation threshold σ0.

After that, these processes are repeated in the advanced or moved window W.

In the print control process of the present embodiment, the control unit 10 mainly executes the program stored in the storage unit 19 in cooperation with each unit and uses the hardware resources.

Figure 4:
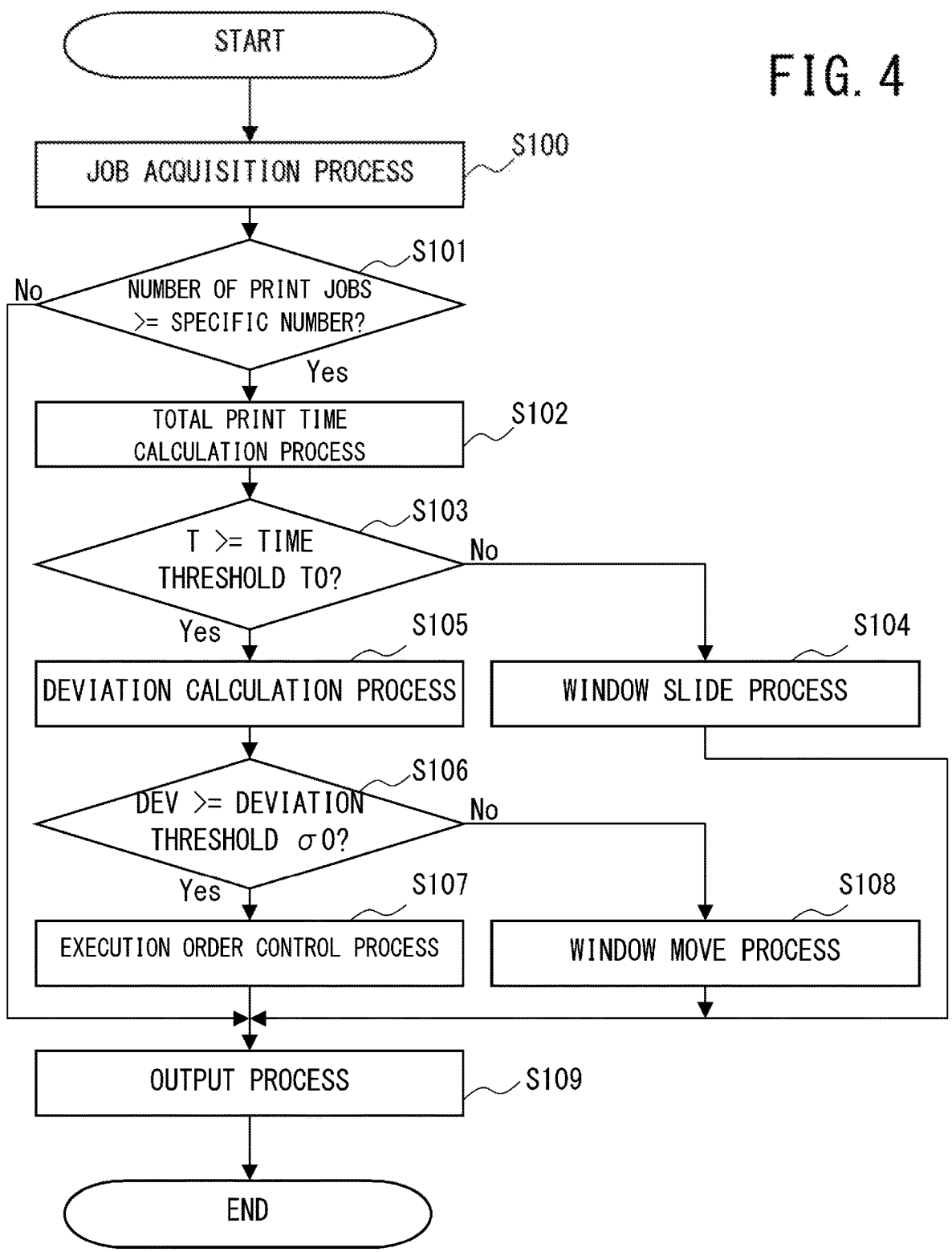
FIG. 4 is a flowchart of a print control process according to the embodiment of the present disclosure.

Hereinafter, with reference to the flowchart of FIG. 4, the details of the print control process are described step by step. In the following description, an example where the specific length of the window W is 10, the time threshold T0 is set to 20 minutes, and the deviation threshold σ0 is set to 0.7 is described.

(Step S100)

Firstly, the job acquisition unit 100 and the time deviation calculation unit 110 perform a job acquisition process.

The job acquisition unit 100 acquires the print job 300 from the terminal, or the like, and stores it in the print queue 200 in the order of FIFO.

Here, in the present embodiment, when calculating the print job 300, the time deviation calculation unit 110 calculates the print time of the stored print job 300 and adds it to the print queue 200. Here, the time deviation calculation unit 110 calculates the print time for each print job 300 by its attribution such as color or monochrome printing, number of prints, number of copies, type of image or character on each page, amount of data, complexity, data amount, and the like. In addition, the parameter(s) required for calculating the print time by using the attribution may be set in the storage unit 19 as a data set.

(Step S101)

Next, the time deviation calculation unit 110 determines whether or not the number of print jobs 300 in the print queue 200 is equal to or greater than the specific number. The print control unit 120 refers to the print queue 200 and confirms the number of print jobs 300.

On this basis, the time deviation calculation unit 110 determines Yes if the number of print jobs 300 is equal to or greater than the specific number, which is, for example, there are jobs of the specific length or longer of window W in the print queue 200. On the other hand, the time deviation calculation unit 110 determines No in other cases, that is, if the number of print jobs 300 is less than the specific number, that is, shorter than the specific length of window W.

Figure 5:
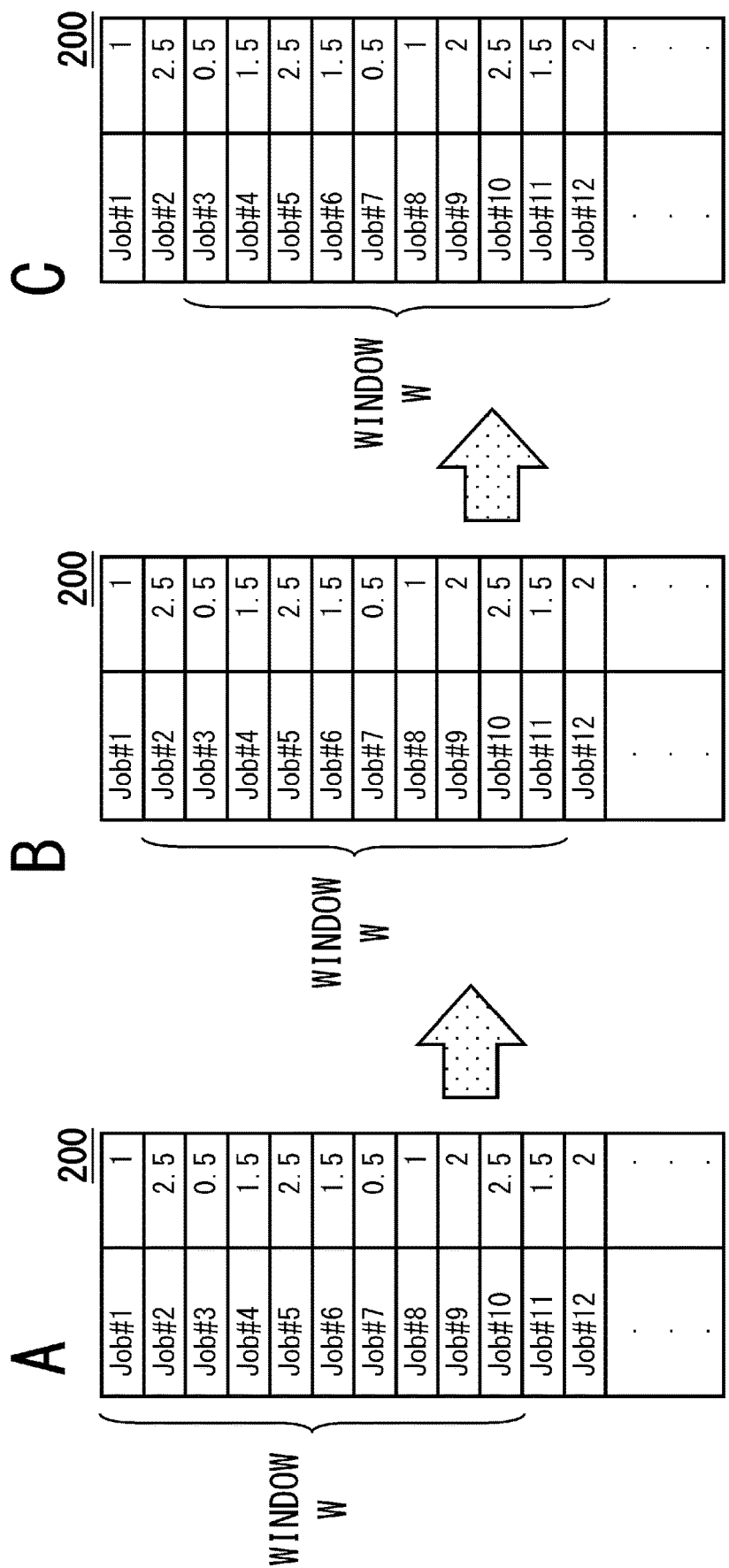
FIG. 5 is a conceptual diagram when the total print time shown in FIG. 4 is less than the threshold.

With reference the element "A" in FIG. 5, an example in which "10" is set as the specific length of the window W, and this is set as a specific number, is described. That is, in this example, the time deviation calculation unit 110 determines Yes because there are 10 or more print jobs 300 in the print queue 200.

In the case of Yes, the time deviation calculation unit 110 advances the process to step S102.

In the case of No, the time deviation calculation unit 110 advances the process to step S109.

(Step S102)

If the number of print jobs 300 is equal to or greater than the specific number, the time deviation calculation unit 110 performs a total print time calculation process. Here, to compare with the time threshold T0, the time deviation calculation unit 110 calculates total print time T, which is the sum of each print time of the print job 300 in the window W, which is in the print queue 200.

Specifically, the time deviation calculation unit 110 sets the window W having the specific length in the print queue 200 where the print jobs 300 are stored. On this basis, the time deviation calculation unit 110 first applies the window W from the beginning of the print queue 200, and it calculates the total print time T of the print jobs 300 in the window.

In the example of the element "A" in FIG. 5, as described above, the window W including ten print jobs 300 as the specific length is applied from the beginning of the print queue 200. On this basis, the total print time T of the ten print jobs 300 is calculated.

(Step S103)

Next, the print control unit 120 determines whether or not the total print time T is equal to or greater than the time threshold T0. The print control unit 120 compares the total print time T calculated by the time deviation calculation unit 110 with the time threshold T0. Then, the print control unit 120 determines Yes if the total print time T is equal to or greater than the time threshold T0. The print control unit 120 determines No in other cases, that is, if the total print time is less than the time threshold T0.

In the case of Yes, the print control unit 120 advances the process to step S105.

In the case of No, the print control unit 120 advances the process to step S104.

(Step S104)

If the total print time T is less than the time threshold T0, the print control unit 120 performs the window slide process.

If the total print time T is shorter than the time threshold T0, all the print jobs 300 in the window W will complete printing in time shorter than the time of the time threshold T0. This is considered acceptable to the user. That is, it can be determined that a long waiting time will not occur due to the print job 300 having a long print time, which is a bottleneck.

Therefore, when the total print time T is less than the time threshold T0, the print control unit 120 does not rearrange the execution order of the print job 300, but it performs slide movement the window W in the print queue 200.

As shown in the element "A" in FIG. 5, the print queue 200 includes a lot of print jobs 300 in the FIFO order. In the following figures, for the explanation, print jobs 300-1 to print jobs 300-n are referred to as "Job #1" to "Job #n". Further, the numerical value next to each print job 300 indicates the calculated print time. In this example, the print control unit 120 first sets the window W for the first ten print jobs 300 of the print queue 200, and it calculates the total print time T (minutes) in the window W.

Here, as described above, for example, the 20 minutes is set as the time threshold T0. In the state of the window W of the element "A" in FIG. 5, the calculated total print time T is less than this time threshold T0. This indicates that there is no print job 300 having a long print time in the window W, and there is no possibility of causing a bottleneck. Therefore, the print control unit 120 slidemoves the window W by one without changing the execution order of the print jobs 300 in the window W.

The element "B" in FIG. 5 shows an example of calculating the total print time T in the window W that has been slide moved by one. Again, the total print time T is minutes, which is less than the time threshold T0. Therefore, the print control unit 120 further slide moves the window W.

The element "C" in FIG. 5 shows an example in which the print control unit 120 calculates the total print time T in the window W that has been slid and moved in this way. As described above, if the total print time T is less than the time threshold T0, the print control unit 120 continues the slide movement of the window W.

After one sliding movement, the print control unit 120 proceeds the process to step S109.

(Step S105)

If the total print time T is equal to or greater than the time threshold T0, the time deviation calculation unit 110 performs the deviation calculation process.

Here, when the total print time T is equal to or greater than the time threshold T0, there is a possibility that the print job 300 having a long print time exists in the window W. Therefore, the time deviation calculation unit 110 calculates the deviation div of all the print jobs 300 in the window W.

The deviation div is calculated by the following equation (1):

[Number 1]

$$\text{Deviation } div = \sqrt{\frac{1}{N}\sum_{i=1}^{N}(x_i - \mu)^2} \qquad \text{equation (1)}$$

Here, N is the total number of print jobs 300 in the window W and is the same as the specific length. $x_i$ is the print time of each print job 300. $\mu$ is the average value obtained by dividing the total print time T by N. In the example of this embodiment, the deviation div is the time deviation in minutes and indicates the spread of the distribution of individual print times. In addition, it is also possible to use other derivative value.

In the present embodiment, the deviation threshold σ0 is calculated by the following equation (2).

Deviation threshold σ0={(time threshold T0/3×specific length) or 1.0}      Equation (2)

That is, the deviation threshold σ0 is the value that three times of the specific length is divided by the time threshold T0 when the value is equal to or less than 1.0. Otherwise, the deviation threshold σ0 is 1.0 when such calculated value is more than 1.0.

As in the above example, when the time threshold T0=20 (minutes) and the specific length of the window W is 10, the deviation threshold σ0=20/10×3=0.67, which is about 0.7. Hereinafter, an example using this deviation threshold σ0=0.7 is described.

(Step S106)

Next, the print control unit 120 determines whether or not the deviation is equals to or greater than deviation threshold σ0. The print control unit 120 determines Yes if the deviation dev of the print time calculated by the time deviation calculation unit 110 is equal to or greater than the deviation threshold σ0. The print control unit 120 determines No in other cases, that is, if the deviation dev of the print time is less than the deviation threshold σ0.

In the case of Yes, the print control unit 120 advances the process to step S107.

In the case of No, the print control unit 120 advances the process to step S108.

(Step S107)

If the deviation div of the print time is equal to or greater than the deviation threshold, the print control unit 120 performs the execution order control process.

The print control unit 120 rearranges the individual print jobs 300 in the window W of the print queue 200 in order from the shortest print time to the longest print time (ascending order). That is, the number of print jobs 300 to be rearranged is the specific length, which is the size of the window W. This makes it possible to reduce the bottleneck caused by the print job 300, which has a long print time. After that, the print control unit 120 moves the window W to the specific length. As a result, as is described later, even if the print job 300 has a long print time, the output will not be delayed, indefinitely.

Figure 6:
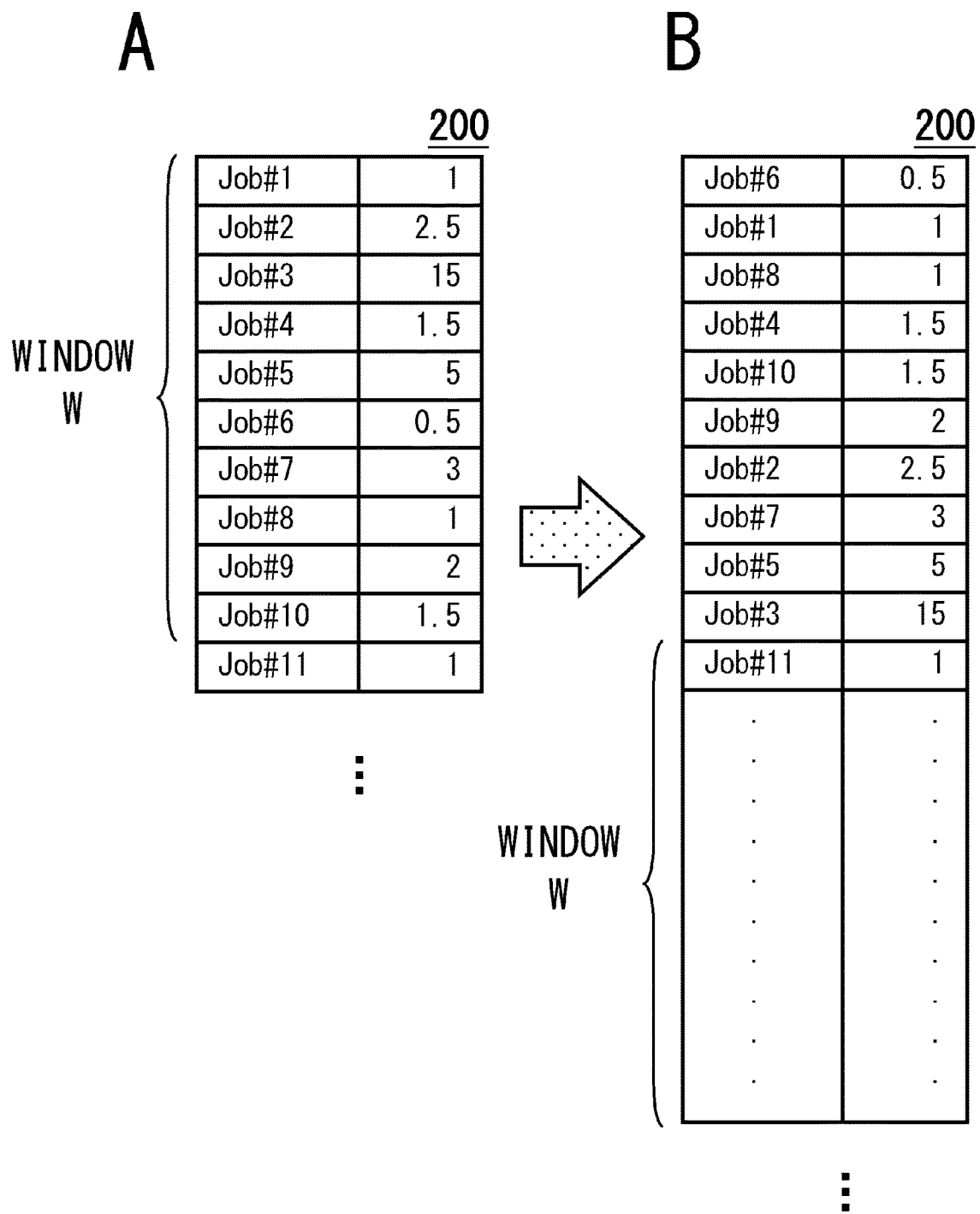
FIG. 6 is a conceptual diagram when the total print time shown in FIG. 4 is equal to or greater than the threshold and the deviation is also equal to or greater than the threshold.

With reference to FIG. 6, the details of this execution order control process are described.

In the element "A" in FIG. 6, as in the example of FIG. 5, the print queue 200 includes many print jobs 300 in the order of FIFO and is described as "Job #1", or the like. Further, the numerical value next to each print job 300 indicates the calculated print time.

In this example, the time deviation calculation unit 110 first applies the window W to the first ten print jobs 300 in the print queue 200, and it calculates the total print time T. The total print time T calculated in this example is more than 20 (minutes), which is the above-mentioned time threshold T0. This indicates that there is a print job 300 with a long print time in the window W, which can cause a bottleneck.

Therefore, the time deviation calculation unit 110 calculates the deviation div. In this example, the deviation div is 4.16, which is much larger than 0.7 in the deviation threshold σ0 as described above, indicating that the print time changes significantly in each print job 300.

Therefore, the print control unit 120 rearranges the execution order of the print job 300 in the window W in the order of the shortest print time to the longest print time. As a result, the print control unit 120 can execute "Job #3" (the print job 300-3), which takes a long print time, at the end of the window W, and thus avoiding a bottleneck.

As shown in the element "B" in FIG. 6, the print control unit 120 then advances the window W by the next specific length in the print queue 200. In this example, the window W moves ten print jobs 300.

In this way, regardless of the print time of "Job #11" (the print job 300-11) and after, "Job #3" is printed before "Job #11", and unlimited delay can be avoided.

After that, the print control unit 120 advances the process to step S109.

(Step S107)

On the other hand, when the deviation div of the print time is less than the deviation threshold $\sigma 0$, the print control unit 120 performs the window move process.

Here, when the deviation div of the print time is smaller than the deviation threshold $\sigma 0$, the difference in the print time of all the print jobs 300 in the window W is small, indicating that the print times are similar. Therefore, it is not necessary to rearrange the execution order of the print jobs 300 in the window W.

Therefore, the print control unit 120 moves the window W to the specific length without rearranging the execution order of the print job 300.

Figure 7:
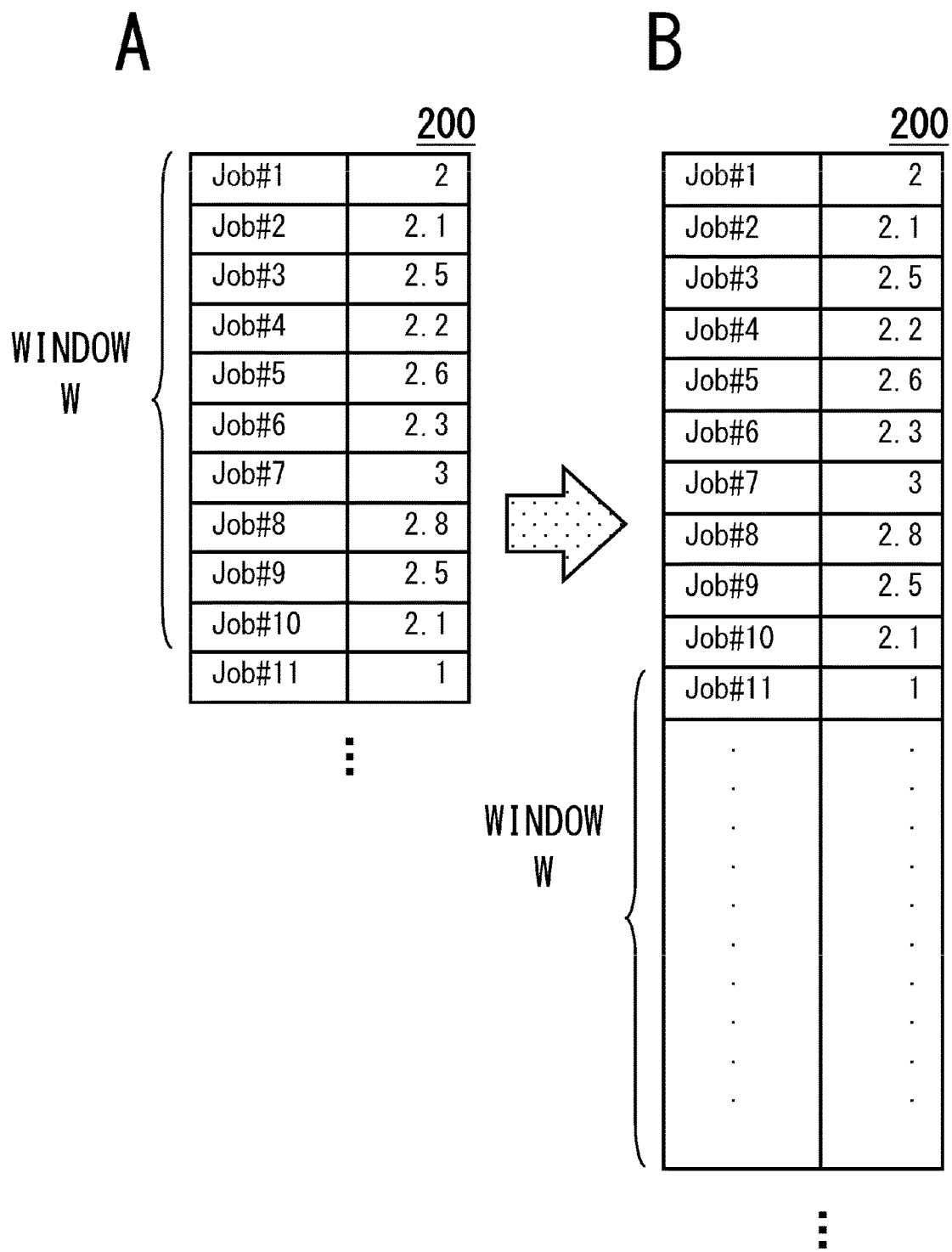
FIG. 7 is a conceptual diagram in the case where the total print time shown in FIG. 4 is equal to or greater than the threshold but the deviation is less than the threshold.

With reference to FIG. 7, the details of the window move process is described.

In the element "A" in FIG. 7, as in the examples of FIGS. 5 and 6, the print queue 200 includes many print jobs 300, which is described as "Job #1", or the like, in the order of FIFO. The value next to each print job 300 indicates the print time.

In this example, the calculated total print time T is 24.1 (minutes), which was 20 (minutes) or more of the above-mentioned time threshold T0. However, the deviation div is 0.31, which is less than 0.7 of the above-mentioned deviation threshold $\sigma 0$. That means the print times are similar. Therefore, the print control unit 120 moves the print job 300 in the window W without changing the execution order. That is, the print control unit 120 advances the window W to the next ten print jobs 300 in the print queue 200.

After that, the print control unit 120 advances the process to step S109.

(Step S109)

Here, the output unit 130 performs output process.

The output unit 130 outputs (executes) the print job 300 from the head of the print queue 200. That is, the output unit 130 outputs the print job 300 in a state where the execution order of the print jobs 300 may be rearranged.

At this time, the output unit 130 interprets the print job 300, performs RIP, and generates raster data 210.

Then, the output unit 130 causes the image forming unit 17 to form an image of the raster data 210 on the recording paper. This makes it possible to print each page. The output unit 130 removes the print job 300, which output has been completed, from the print queue 200. The output unit 130 can also output by a method other than printing, for example, PDF generation, e-mail transmission, facsimile transmission, or the like.

After that, the print control unit 120 repeats the above processes for the remaining print jobs 300 in the print queue 200.

As described above, the print control process according to the embodiment of the present disclosure is completed.

As configured in this way, the following effects can be obtained.

In a typical apparatus, print jobs are ordered just in FIFO according to the time when print requests are received. Here, resources for printing are often shared, and many users try to use the image forming apparatus at the same time. As a result, even if there is only one print job with a long print time including a large number of pages in the print queue, there is a possibility of becoming an output bottleneck.

In a typical technology, a job processing system is known that automatically changes the print job order in a print queue according to a specific sorting option specified by an operator. When a new print job is received, the system inserts it in the appropriate position on the print queue according to the sort settings specified by the operator. The sort settings include FIFO, short job first, priority order, binder first, and the like. The short job first setting is simply a setting for printing a short print job first. This setting is rarely used because a print job having long print time may have to wait for a long time to print. On the other hand, in priority order and binder first, the priority of print jobs can be changed.

However, in the typical technology, a user request to change the print order is required, and confirmation of the change is also required by another user.

On the other hand, the image forming apparatus 1 according to the embodiment of the present disclosure is an information processing apparatus for processing the print jobs 300, including: a time deviation calculation unit 110 that sets a window W of the specific length in the print queue 200 in which the print jobs 300 are stored and calculate total print time T and deviation div of the print time of the print jobs 300 in the window W; a print control unit 120 that controls execution order of the print jobs 300 in the window W based on the total print time T and the deviation div calculated by the time deviation calculation unit 110; an output unit 130 that outputs the print jobs 300 in the execution order controlled by the print control unit 120.

With this configuration, for example, the print job 300-1 to the print job 300-$n$ in the print queue 200 are rearranged in units of windows W based on the conditions before the execution of the print job 300. As a result, it is possible to execute a process such as executing the print job 300 having a short print time before the print job 300 having a long print time which becomes a bottleneck. This eliminates the need for user requests and confirmation of changes by other users.

That is, when there are a large number of print jobs 300 having a short print time in the print queue 200, the delay due to the print job 300 having a long print time can be automatically avoided.

Further, in the image forming apparatus 1 according to the embodiment of the present disclosure, the print control unit 120 controls the execution order of the print job 300 when the total print time is equal to or greater than the time threshold T0 and the deviation is equal to or greater than the deviation threshold $\sigma 0$.

With this configuration, it is possible to control the execution order when the output times of the print jobs 300 in the window are extremely different and totally long.

Further, in the present embodiment, the specific length of the window W is set as a fixed value.

This configuration eliminates the need for additional computational resources. In addition, window W allows a print job 300 with long print time to be "captured" and sorted within that window W.

Further, in the image forming apparatus 1 according to the embodiment of the present disclosure, the print control unit 120 sorts the print jobs 300 in the window W in ascending order of print time as the control of the execution order of the print jobs 300.

With this configuration, if there are many print jobs 300 in the print queue 200 and the waiting time is long, the print time can be shortened. Further, by printing the print job 300 having a short print time first, it is possible to prevent the print job 300 having a long print time from becoming a bottleneck. Therefore, it is possible to improve the convenience of the user of the print job 300 having a short print time.

Further, even if the job has a long print time, it can be printed with a waiting time within the specific length. As a result, an unlimited delay can be avoided regardless of the number of print jobs 300 outside the window W of the print queue 200.

Further, in the image forming apparatus 1 according to the embodiment of the present disclosure, when the total print time is less than the time threshold T0, the print control unit 120 does not rearrange the execution order of the print job 300 and slide window W by one in the print queue 200.

With this configuration, if the time threshold is less than T0, the window W can be slide and advanced. Therefore, when the number of print jobs 300 having a long print time is small, the print jobs can be output in the order intended by the user. As a result, the predictability by the user can be improved, and the usability can be improved.

Further, in the image forming apparatus 1 according to the embodiment of the present disclosure, when the deviation div is less than the deviation threshold σ0, the print control unit 120 does not rearrange the execution order of the print job 300 and moves the window by the next specific length in the print queue 200.

With this configuration, if the deviation div is not so large, even a print job 300 with a long print time can be output as it is without delay in a predictable manner.

Other Embodiments

In the above-described embodiment, an example is described in which the information processing apparatus for processing the print jobs 300 is the image forming apparatus 1.

However, the information processing apparatus that processes the print job 300 may be a workstation, a PC, other computing apparatus, a server that generates the print job 300, or the like. Further, these apparatuses may not be connected with the network 5, or it may be a single apparatus.

Figure 8:
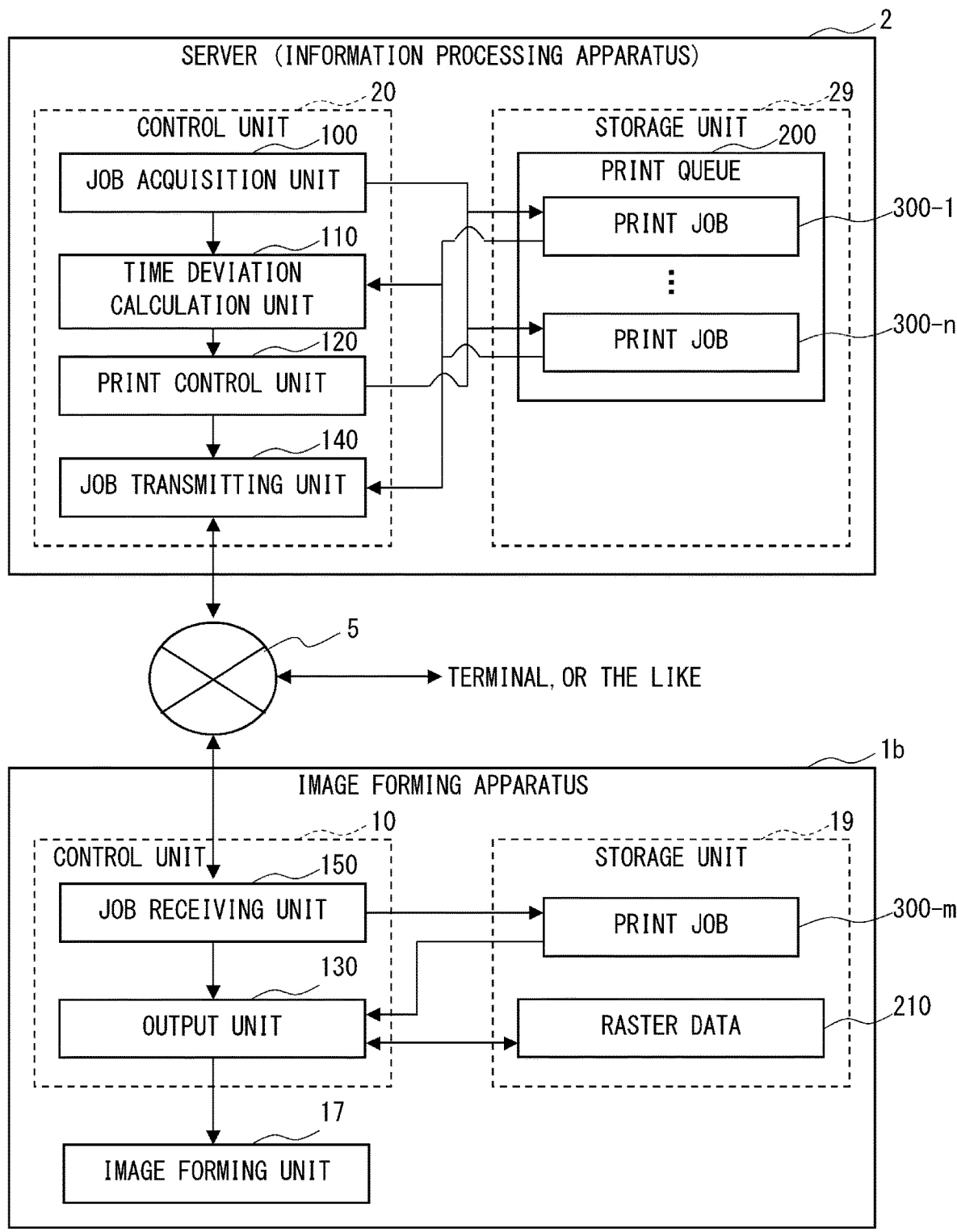
FIG. 8 is a system configuration diagram of an image forming system according to another embodiment of the present disclosure.

With reference to FIG. 8, an example of an image forming system Y that controls the order of print jobs 300 by printing via a network 5 or in a commercial environment by using the server 2 used for pull-printing, or the like, as an information processing apparatus is described.

That is, the image forming system Y according to another embodiment of the present disclosure is an image forming system including an image forming apparatus 1b and a server 2, which is an information processing apparatus for processing the print jobs 300 for the image forming apparatus 1b. The server 2 includes: a job acquisition unit 100 that acquires the print job 300 and stores it in the print queue 200; a time deviation calculation unit 110 that sets a window having a specific length in the print queue 200 in which the print job 300 acquired by the job acquisition unit 100 is stored and calculates total print time T and deviation div of the print time of the print jobs 300 in the window; a print control unit 120 that controls the execution order of the print jobs 300 in the window based on the total print time T and the deviation div calculated by the time deviation calculation unit 110; and a job transmitting unit 140 that transmits the print job 300 to the image forming apparatus 1b in the execution order controlled by the print control unit 120. The image forming apparatus 1b includes: a job receiving unit 150 that receives the print job 300 from the server 2; and an image forming unit 17 that forms an image of the print job 300.

In this configuration, the server 2 includes a job transmitting unit 140 instead of the output unit 130. On this basis, the image forming apparatus 1b acquires the print job 300-m one by one, and the output unit 130 perform RIP for the print jobs 300-m to the raster data 210 and outputs it.

With this configuration, the execution order of the print job 300 can be controlled even in a configuration that uses the server 2 used for pull-printing. That is, various configurations can be adapted.

Further, in the above-described embodiment, an example in which all the print jobs 300 are stored in the FIFO in the same priority order is described.

However, the print job 300 having a high priority may be configured to be inserted at the head of the print queue 200, or the like. In this case, the window W may be slid from the head, or the like. Alternatively, for the print job 300 having a high priority, a process may be performed such that the comparison with the time threshold value T0 is not applied.

With this configuration, the print job 300 having a high priority can be printed in a high priority regardless of the above-mentioned adjustment of the print execution order.

Further, in the above-described embodiment, an example by using 10 as the specific length of windows W, 20 (minutes) as the time threshold T0, and 0.7 as the deviation threshold σ0 is described.

However, the specific length of the window W, the time threshold T0, and the deviation threshold σ0 can be set to appropriate values by the administrator or the user.

Further, the present disclosure is applicable even when a job other than a print job is included. That is, it can also be applied to a scan job, a facsimile transmission job, and the like. Furthermore, it can be applied to each queue of each type of the job.

Further, it goes without saying that the configuration and operation of the above-described embodiment are examples, and it can be appropriately modified and executed without departing from the aim of the present disclosure.

What is claimed is:

1. An information processing apparatus for processing print jobs, comprising:
    a time deviation calculation unit configured to set a window of a specific length in a print queue in which the print jobs are stored and calculate total print time and deviation of the print time of the print jobs in the window;
    a print control unit configured to control execution order of the print jobs in the window based on the total print time and the deviation calculated by the time deviation calculation unit;
    an output unit configured to output the print jobs in the execution order controlled by the print control unit, wherein
    the print control unit controls the execution order of the print jobs when the total print time is equal to or greater than time threshold and the deviation is equal to or greater than deviation threshold.

2. The information processing apparatus according to claim 1, wherein
    the print control unit rearranges, as for controlling the execution order of the print jobs, the print jobs in the window in ascending order of the print time.

3. The information processing apparatus according to claim 1, wherein the print control unit does not rearrange the execution order of the print jobs when the total print time is less than the time threshold and advances the window by one in the print queue.

4. The information processing apparatus according to claim 1, wherein the print control unit does not rearrange the execution order of the print jobs when the deviation is less than the deviation threshold and advances the window by next the specific length in the print queue.

5. An image forming system having an image forming apparatus and an information processing apparatus for processing print jobs of the image forming apparatus, the information processing apparatus including:

a job acquisition unit configured to acquire the print jobs and store the print jobs in print queue, a time deviation calculation unit configured to set a window of a specific length in a print queue in which the print jobs acquired by the job acquisition unit are stored and calculate total print time and deviation of the print time of the print jobs in the window, a print control unit configured to control execution order of the print jobs in the window based on the total print time and the deviation calculated by the time deviation calculation unit, and a job transmitting unit configured to transmit the print jobs to the image forming apparatus in the execution order controlled by the print control unit; and the image forming apparatus including:

a job receiving unit configured to receive the print jobs from the information processing apparatus, and an image forming unit that forms an image of each of the print job, wherein the print control unit controls the execution order of the print jobs when the total print time is equal to or greater than time threshold and the deviation is equal to or greater than deviation threshold.

6. The image forming system according to claim 5, wherein the print control unit rearranges, as for controlling the execution order of the print jobs, the print jobs in the window in ascending order of the print time.

7. The image forming system according to claim 5, wherein the print control unit does not rearrange the execution order of the print jobs when the total print time is less than the time threshold and advances the window by one in the print queue.

8. The image forming system according to claim 5, wherein the print control unit does not rearrange the execution order of the print jobs when the deviation is less than the deviation threshold and advances the window by next specific length in the print queue.

9. A job processing method executed by an information processing apparatus for processing print jobs of an image forming apparatus, comprising the steps of:

setting a window of a specific length in a print queue in which the print jobs are stored;

calculating total print time and deviation of the print time of the print jobs in the window;

controlling execution order of the print jobs in the window based on calculated total print time and deviation; and outputting the print jobs in controlled execution order, wherein the step of controlling execution order of the print jobs comprises controlling the execution order of the print jobs when the total print time is equal to or greater than time threshold and the deviation is equal to or greater than deviation threshold.

10. The job processing method according to claim 9, wherein the method comprises rearranging, as for controlling the execution order of the print jobs, the print jobs in the window in ascending order of the print time.

11. The job processing method according to claim 9, wherein the method comprises not rearranging the execution order of the print jobs when the total print time is less than the time threshold; and advancing the window by one in the print queue.

12. The job processing method according to claim 9, wherein the method comprises not rearranging the execution order of the print jobs when the deviation is less than the deviation threshold; and advancing the window by next specific length in the print queue.

* * * * *